(12) United States Patent
Sigmund et al.

(10) Patent No.: US 10,808,139 B2
(45) Date of Patent: *Oct. 20, 2020

(54) DURABLE SUPERHYDROPHOBIC COLOR PAINT

(71) Applicant: UNIVERSITY OF FLORIDA RESEARCH FOUNDATION, INC., Gainesville, FL (US)

(72) Inventors: Wolfgang M. Sigmund, Gainesville, FL (US); Yung-Chieh Hung, Zhubei (TW)

(73) Assignee: University of Florida Research Foundation, Inc., Gainesville, FL (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/096,873

(22) PCT Filed: Apr. 11, 2017

(86) PCT No.: PCT/US2017/026943
§ 371 (c)(1),
(2) Date: Oct. 26, 2018

(87) PCT Pub. No.: WO2017/189220
PCT Pub. Date: Nov. 2, 2017

(65) Prior Publication Data
US 2019/0136084 A1    May 9, 2019

Related U.S. Application Data (60) Provisional application No. 62/327,672, filed on Apr. 26, 2016.

(51) Int. Cl.
| | | |
|---|---|---|
| C09D 127/16 | (2006.01) | |
| C09D 7/62 | (2018.01) | |
| C09D 5/00 | (2006.01) | |
| C09D 7/40 | (2018.01) | |
| C09D 133/12 | (2006.01) | |
| C09D 5/29 | (2006.01) | |
| C09D 7/20 | (2018.01) | |
| C09D 7/63 | (2018.01) | |
| C08K 3/22 | (2006.01) | |
| C08K 3/36 | (2006.01) | |
| C08K 5/1535 | (2006.01) | |
| C08K 5/521 | (2006.01) | |
| C08K 9/06 | (2006.01) | |
| B05D 5/06 | (2006.01) | |
| B05D 5/08 | (2006.01) | |
| C08L 33/12 | (2006.01) | |

(52) U.S. Cl.
CPC ............ *C09D 127/16* (2013.01); *C08K 3/22* (2013.01); *C08K 3/36* (2013.01); *C08K 5/1535* (2013.01); *C08K 5/521* (2013.01); *C08K 9/06* (2013.01); *C09D 5/00* (2013.01); *C09D 5/29* (2013.01); *C09D 7/20* (2018.01); *C09D 7/40* (2018.01); *C09D 7/62* (2018.01); *C09D 7/63* (2018.01); *C09D 7/67* (2018.01); *C09D 7/68* (2018.01); *C09D 7/69* (2018.01); *C09D 133/12* (2013.01); *B05D 5/06* (2013.01); *B05D 5/083* (2013.01); *C08K 2003/2227* (2013.01); *C08K 2003/2241* (2013.01); *C08K 2201/005* (2013.01); *C08L 33/12* (2013.01)

(58) Field of Classification Search
CPC .......... C09D 127/16; C09D 7/62; C09D 7/63; C09D 7/67; C09D 7/68; C09D 7/69; C09D 7/20; C08L 33/12; C08K 3/22; C08K 3/36; C08K 9/06; C08K 5/1535; C08K 5/521
USPC ....................................................... 524/111
See application file for complete search history.

(56) References Cited

U.S. PATENT DOCUMENTS

| | | | | |
|---|---|---|---|---|
| 6,362,271 | B1* | 3/2002 | Lin | C09D 127/16 523/346 |
| 2007/0027232 | A1* | 2/2007 | Walsh, Jr. | C09D 7/69 523/218 |
| 2007/0166544 | A1 | 7/2007 | Hennemann et al. | |
| 2011/0111656 | A1* | 5/2011 | Gao | C09D 127/18 442/59 |
| 2012/0296029 | A1* | 11/2012 | Liu | C08F 293/005 524/520 |

(Continued)

FOREIGN PATENT DOCUMENTS

EP       0960918 A2    1/1999

OTHER PUBLICATIONS

International Search Report, Written Opinion and International Preliminary Report on Patentability in PCT/US2017/026943, dated Jul. 11, 2017.

*Primary Examiner* — Hui H Chin
(74) *Attorney, Agent, or Firm* — Timothy H. Van Dyke; Wolter Van Dyke Davis, PLLC (57) ABSTRACT

A colored paint that imparts a superhydrophobic surface on an object is a suspension of hydrophobic particles in a polymeric binder and a plasticizer in a solvent or mixed solvent, wherein at least a portion of the hydrophobic particles are colored particles. Colored particles can be ultramarine, iron oxide, chromium oxide, or any other colored metal oxide. The hydrophobic particles can be metal oxide particles that are surface functionalized with a fluorinated alkyl silane or an alkyl silane. The binder is a mixture of PDVF and PMMA in a ratio of 3:1 to 10:1. The plasticizer is a mixture of triethyl phosphate and perfluoro(butyltetrahydrofuran) or other perfluorinated hydrocarbon. Surfaces coated using this paint display contact angles in excess of 150° and resist abrasion.

10 Claims, 6 Drawing Sheets

(56) References Cited

U.S. PATENT DOCUMENTS

2014/0238263 A1\* 8/2014 Scheonfisch ............. B05D 1/02
106/2

\* cited by examiner

| Fluorinated ultramarine 0.6g+ standard binder solution - sample B1 | Ultramarine 0.1g+ 0.6g fluorinated silica + standard binder solution - sample B2 | Ultramarine 0.2g+ 0.6g fluorinated silica + standard binder solution- sample B3 | Ultramarine 0.3g+ 0.6g fluorinated silica + standard binder solution – sample B4 |
|---|---|---|---|
| WCA: 150°±3° | WCA: 153°±3° | WCA: 151°±3° | WCA: 149°±3° |
| | | | |

| Fluorinated iron oxide 0.6g+ standard binder solution - sample R1 | Iron oxide 0.1g+ 0.6g fluorinated silica + standard binder solution - sample R2 | Iron oxide 0.2g+ 0.6g fluorinated silica + standard binder solution- sample R3 | Iron oxide 0.3g+ 0.6g fluorinated silica + standard binder solution – sample R4 |
|---|---|---|---|
| WCA: 159°±3° | WCA: 153°±3° | WCA: 153°±3° | WCA: 150°±3° |

| Fluorinated chromium hydroxide 0.6g+ standard binder solution - sample G1 | Chromium hydroxide 0.1g+ 0.6g fluorinated silica + standard binder solution - sample G2 | Chromium hydroxide 0.2g+ 0.6g fluorinated silica + standard binder solution - sample G3 | Chromium hydroxide 0.3g+ 0.6g fluorinated silica + standard binder solution - sample G4 |
|---|---|---|---|
| WCA: 160°±3° | WCA: 155°±3° | WCA: 160°±3° | WCA: 161°±3° |

DURABLE SUPERHYDROPHOBIC COLOR PAINT

CROSS-REFERENCE TO A RELATED APPLICATION

This application claims the benefit of U.S. Provisional Application Ser. No. 62/327,672, filed Apr. 26, 2016, the disclosure of which is hereby incorporated by reference in its entirety, including all figures, tables and drawings.

BACKGROUND OF INVENTION

Superhydrophobicity is defined as a material or surface with a water contact angle greater than 150° and the roll off angle or contact angle hysteresis less than 10°. The coating is hard to wet by water which imparts some compelling properties like self-cleaning and antibio-fouling. Textbooks describe superhydrophobicity as depending on the surface roughness or topography. The best published phenomenon is the lotus-effect, which occurs because of the affluent tiny protrusions on the lotus or taro leaf to yield a contact angle >150° accompanied by a few degrees of roll-off angle. The second factor that is important for superhydrophobicity depends on the surface material and, typically, fluorinated compounds are employed to reduce surface energy to levels appropriate for superhydrophobicity. The most crucial criterion for superhydrophobicity is retaining the water droplet in the Cassie-Baxter state, where air pockets are trapped under the droplet to reduce the solid-liquid interface. State of the art coatings with micro-scale roughness often possess the drawbacks of poor durability and/or poor optical properties. Therefore, a durable superhydrophobic surface that is scalable to coverage of a large surface remains a goal. Superhydrophobic paints, though not durable, have only been formulated as white paint. Coloring with standard pigments caused deterioration of superhydrophobicity. The particulate pigments that can be added to paint that do not detract or help in superhydrophobic behavior are desirable.

BRIEF SUMMARY

Embodiments of the invention are directed to colored superhydrophobic paints that comprise hydrophobic particles, a polymer binder, and at least one plasticizer suspended in a solvent, wherein at least one of the hydrophobic particles is a colored hydrophobic particle. The hydrophobic particles can be metal oxide particles, which can, optionally, include white metal oxide particles, such as $SiO_2$, $TiO_2$, and/or $Al_2O_3$ coated with a fluorinated alkyl silane or an alkyl silane and necessarily include colored metal oxide particles, such as ultramarine, iron oxide and/or chromium oxide coated with a fluorinated alkyl silane or an alkyl silane. The hydrophobic particles are 40 nm to 100 micrometers in diameter. The polymer binder can be a mixture of PDVF and PMMA in a 3:1 to 10:1 ratio. The plasticizer can be a mixture of triethyl phosphate and perfluoro(butyltetrahydrofuran). The solvent can be DMF (dimethylformamide), MEK (methyl ethyl ketone), or isophorone. Using the superhydrophobic paint, any object having a surface comprising glass, plastic, wood, or metal can be painted by spraying, rolling, brushing, or spin coating to form a superhydrophobic object.

DETAILED DISCLOSURE

Figure 1:
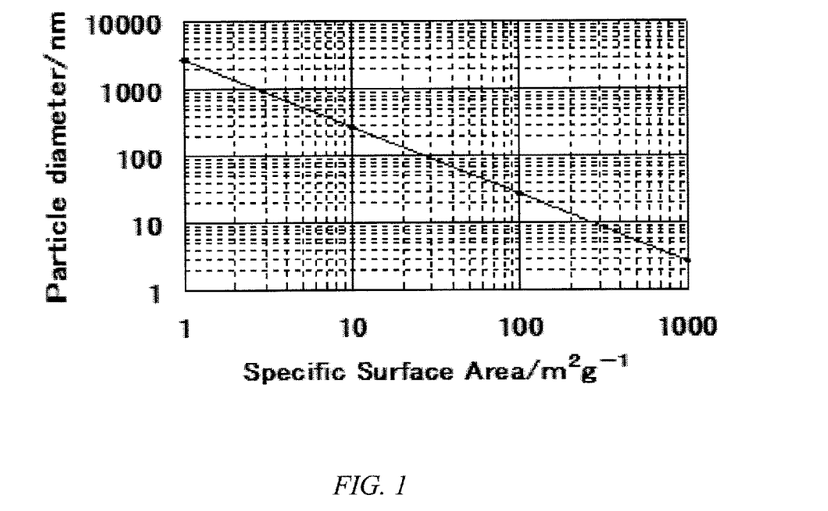
FIG. 1 shows a plot of particle size for the specific surface area of silica particles used to prepare exemplary paints according to an embodiment of the invention.

Embodiments of the invention are directed to a non-white colored paint comprising: optionally, white functionalized particles; binders that are a polymer blend of polymethyl methacrylate (PMMA) and polyvinylidene fluoride (PVDF); plasticizers that are triethyl phosphate and perfluoro compounds; and colored particles that allow the retention of a contact angle in excess of about 150° for the superhydrophobicity. In embodiments of the invention, silica particles of specific surface area of, for example, 35-65 $m^2/g$ are employed as a base white hydrophobic particle after surface functionalization. As indicated in FIG. 1, the diameter of silica particles is 50 to 110 nm. The silica particles are functionalized by a silane coupling agent, for example, heptadecafluoro-1,1,2,2-tetrahydrodecyltrichlorosilcane, to provide a fluorination entity on the particles. In embodiments of the invention, the binders are a blend of, for example, PMMA and PVDF of molecular weights, for example, 75,000 and 900,000 to 1,300,000, respectively, that comprise a solution in mixed dimethylformamide and acetone. In embodiments of the invention, the plasticizer is, for example, a mixture of triethylphosphate and perfluoro (butyltetrahydrofuran) or other phosphates and prefluorocarbons. This composition is substituted for, or is included with the white particles, blue, red, green and/or other colored pigments, for example, from hydrophobized ultramarine (lapis lazuli, a feldspathoid silicate), hydrophobized red matte (iron oxide) and hydrophobized green matte (chromium hydroxide), or other colored metal oxides, which have been hydrophobized in the manner of the silica particles, above, or hydrophobized by surface treatment with other silane coupling agents. By combination of these components a homogeneous colored superhydrophobic paint is formed.

Other white particulates in addition to $SiO_2$ can be any white metal oxide, including, but not limited to, $TiO_2$, $Al_2O_3$, or other related ceramic powders having particle diameters of 40 nm to 100 micrometers. The particles can be functionalized with a compound to form a self-assembled monolayer or a surface specific attachment that is fluorinated for a low surface energy, where, in addition to heptadecafluoro-1,1,2,2-tetrahydrodecyltrichlorosilcane, the functionalizing agent can be heptadecafluorodecyl trichlorosilane, heptadecafluoro-1,1,2,2,-tetrahydrodecyltrimethoxy-silane, 1H,1H,2H,2H-perfluorodecyltri-ethoxysilane, other perfluoroalkyl silanes, or a long-chain alkyl silane, such as octadecyltricholosilane. The volume percent particulates in the paint can be 50 to 75%. The binder can be, for example, PDVF and PMMA mixture, and has a PVDF to PMMA ratio of about 5 to 1, about 10 to 1, about 9 to 1, about 8 to 1, about 7 to 1, about 6 to 1, about 4 to 1, about 3 to 1, or any ratio between about 3:1 and 10:1

According to an embodiment of the invention, the paint can be applied and dried to form a coating on a substrate. The paint can be applied by spraying, rolling, brushing or any other method. The substrate can be any surface, including a glass, plastic, metal, wood, or as a top coating on another coating. By changing the proportion of particles of the base white pigment and a "standard binder solution," and formulated as provided in the Methods and Materials section, below, paints that are durable and hydrophobic can be produced, as indicated in Table 1, below. The white particles can be substituted with colored particles with similar resulting properties, as provided below in the Methods and Materials section.

TABLE 1

Coating properties for various white paint compositions.

| Formulation | Contact Angle | Observations |
| --- | --- | --- |
| 74% particles | >165° | Particles removed by rubbing |
| 61% particles | >160° | Particles retained after rubbing |
| 39% particles | ≈120° | Particles firmly embedded |
| 64% particles | >165° | Particles retained after rubbing |

The formulation with 64% particles, referred to as the SG paint, was used to formulate with colored particles to form exemplary colored paints, according to embodiments of the invention. Alternatively, the paint can be prepared with any solvent that permits the blending of PVDF and PMMA. Solvents that can be employed include, but are not limited to DMF (dimethylformamide), MEK (methyl ethyl ketone), and isophorone. Additionally, other acrylates and methacrylates can be combined in the paint. The acrylates and methacrylates can be homopolymers or copolymers. For example, a copolymer of methyl methacrylate and ethyl acrylate can be used to form the binder. PMMA can be atactic, syndiotactic, or isotactic.

Methods and Materials

Silica particles, Aerosil Ox 50, were purchased from Evonik Industries. The specific surface area of the particles is 35-65 $m^2/g$. The diameter of silica particles is between 50–110 nm. Heptadecafluoro-1,1,2,2,-tetrahydrodecyltrichlorosilane was purchased from Gelest Inc. PVDF was obtained from Kynar Hsv 900 with $M_n$ 900,000-1,300,000 g/mol and PMMA was obtained from Polyscience Inc. with $M_n$ 75,000. Perfluoro(butyltetrahydrofuran) FC-75™, was purchased from ACROS. Blue matte, red matte, and green matte, are ultramarine, iron oxide and chromium oxide and were purchased from Powdered Up Dolly.

Silica particles were dehydrated in an oven at 120° C., cooled and dispersed in chloroform. Subsequently, heptadecafluoro-1,1,2,2,-tetrahydrodecyltrichlorosilcane was added to the silica-chloroform dispersion and stirred for one hour. The dispersion was centrifuged and the chloroform decanted. The fluorinated particles were dried at 120° C. on a heating plate. In like manner, ultramarine, iron oxide and chromium oxide were treated with heptadecafluoro-1,1,2,2,-tetrahydrodecyltrichlorosilane to form hydrophobized blue matte, red matte, and green matte.

PVDF and PMMA were blended where 0.21 g PVDF, 0.8 g acetone, 0.04 g PMMA, 1 g triethyl phosphate and 100 μl FC-75 using a vortex mixture to homogenize the liquid, which is referred to herein as the "standard binder solution."

Figure 2:
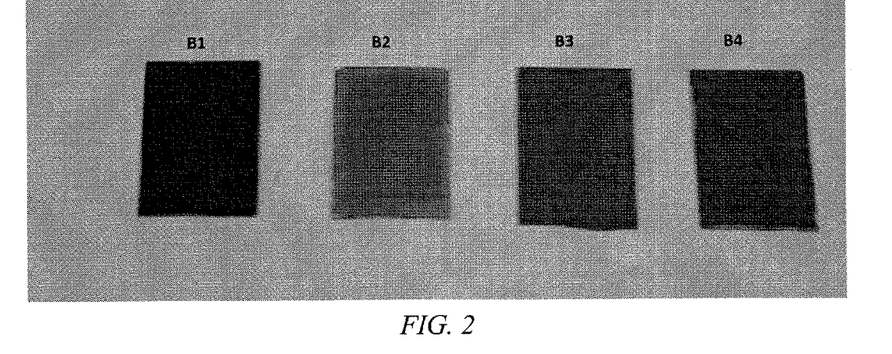
FIG. 2 shows a photograph of surfaces painted with blue paints B1-B4, according to an embodiment of the invention.
Figure 3:
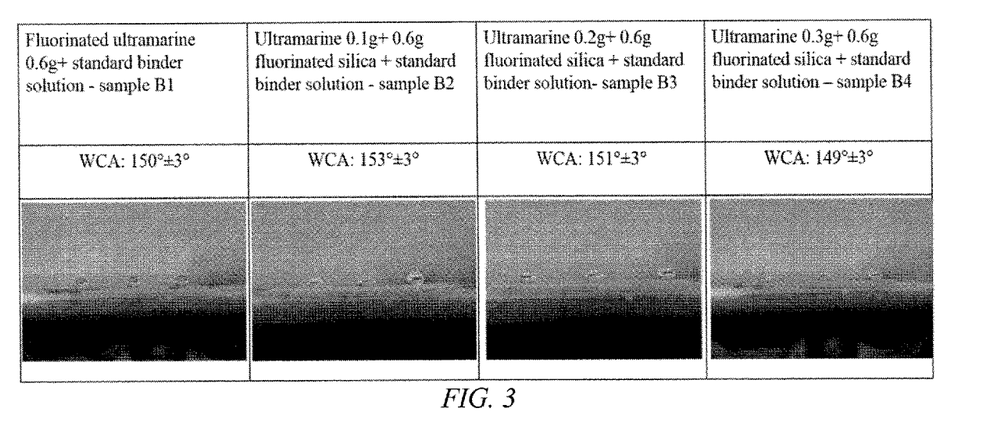
FIG. 3 shows a photograph of surfaces coated with B1-B4 paints, according to an embodiment of the invention, with 20 µL water droplets from which the water contact angles (WCAs).

Blue paint B1 was formed from hydrophobized blue matte 0.6 g and the standard binder solution (3.96 g). Blue paints B2 to B4 were formed by combining 4.56 g of SG paint with 0.1, 0.2, and 0.3 g of hydrophobized blue matte, respectively. The intensity of the blue color is shown in the photograph of FIG. 2. Water contact angles were measured using DI water with droplets of 20 μL at an ambient temperature of about 20° C., for superhydrophobicity evaluation, as shown in FIG. 3.

Figure 4:
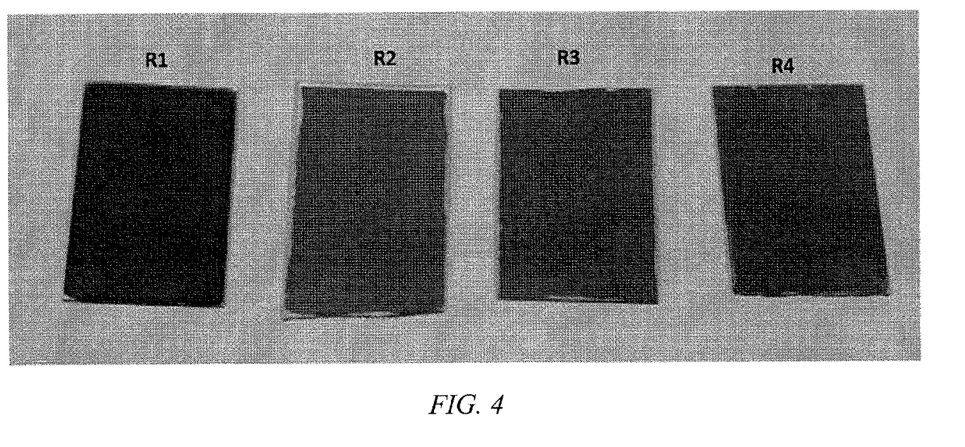
FIG. 4 shows a photograph of surfaces painted with red paints R1-R4, according to an embodiment of the invention.
Figure 5:
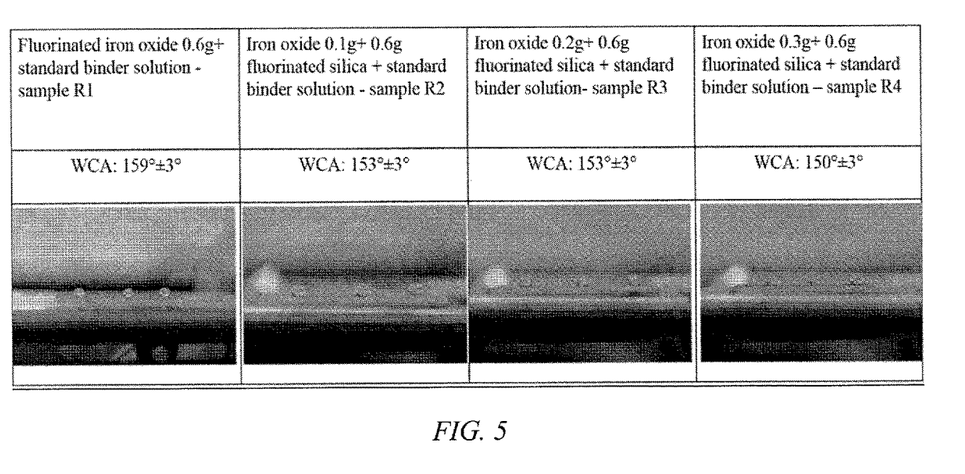
FIG. 5 shows a photograph of surfaces coated with R1-R4 paints, according to an embodiment of the invention, with 20 µL water droplets from which the water contact angles (WCAs).

Red paint R1 was formed from hydrophobized red matte 0.6 g and the standard binder solution (3.96 g). Red paints R2 to R4 were formed by combining 4.56 g of SG paint with 0.1, 0.2, and 0.3 g of hydrophobized red matte, respectively. The intensity of the red color is shown in the photograph of FIG. 4. Water contact angles were measured using DI water with droplets of 20 μL at an ambient temperature of about 20° C., for superhydrophobicity evaluation, as shown in FIG. 5.

Figure 6:
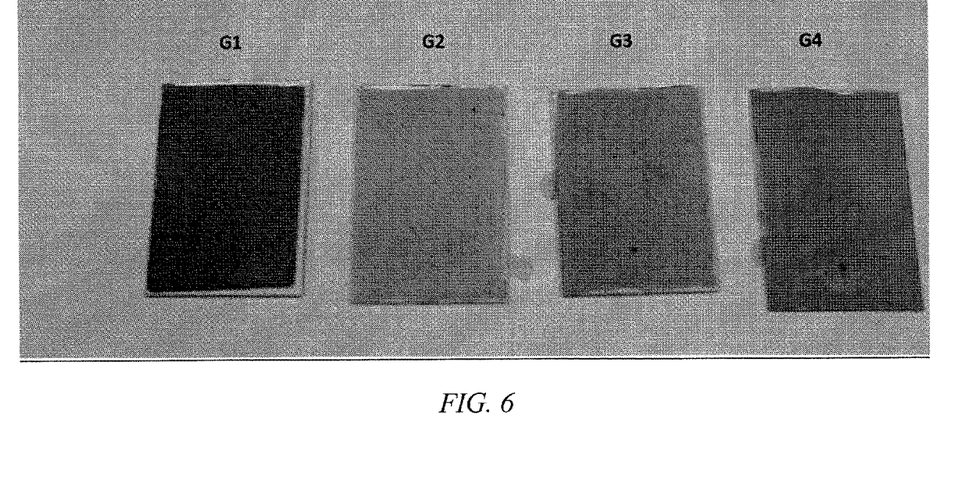
FIG. 6 shows a photograph of surfaces painted with green paints G1-G4, according to an embodiment of the invention.
Figure 7:
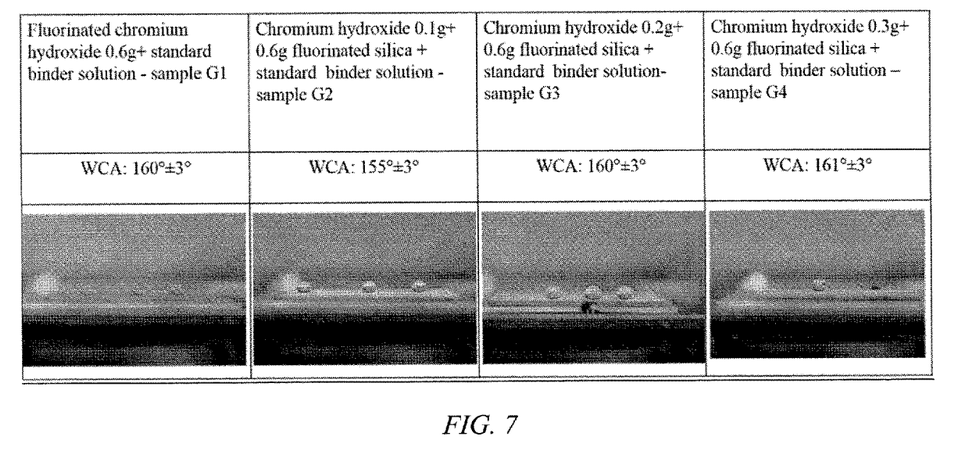
FIG. 7 shows a photograph of surfaces coated with G1-G4 paints, according to an embodiment of the invention, with 20 µL water droplets from which the water contact angles (WCAs).

Green paint G1 was formed from hydrophobized green matte 0.6 g and the standard binder solution (3.96 g). Green paints G2 to G4 were formed by combining 4.56 g of SG paint with 0.1, 0.2, and 0.3 g of hydrophobized green matte, respectively. The intensity of the green color is shown in the photograph of FIG. 6. Water contact angles were measured using DI water with droplets of 20 μL at an ambient temperature of about 20° C., for superhydrophobicity evaluation, as shown in FIG. 7.

Abrasion Testing and Wear Indexing of Painted Surfaces

Wear testing was carried out in the following manner. A Taber linear 5700 Abrader was used with silicon carbide metallurgical paper 1200P with a loaded weight of 0.98 N, with water droplet of 20 μl employed for contact angle measurement at 20° C.

Figure 8:
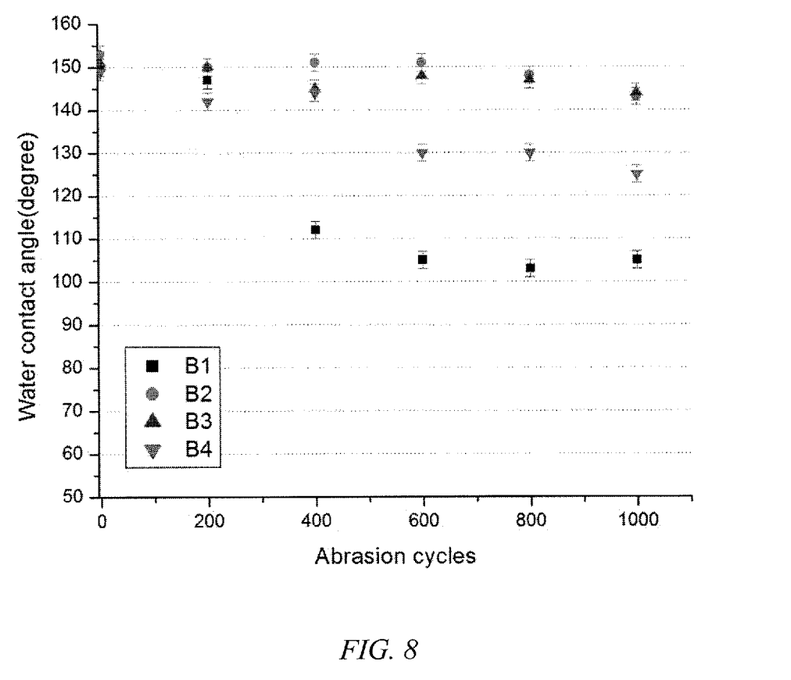
FIG. 8 shows composite plots of WCAs on surfaces coated with B1-B4 paints, according to an embodiment of the invention, from 20 µL water droplets at 20° C. after a series of 0 to 1000 cycles of wiping with an abrasive.
Figure 9:
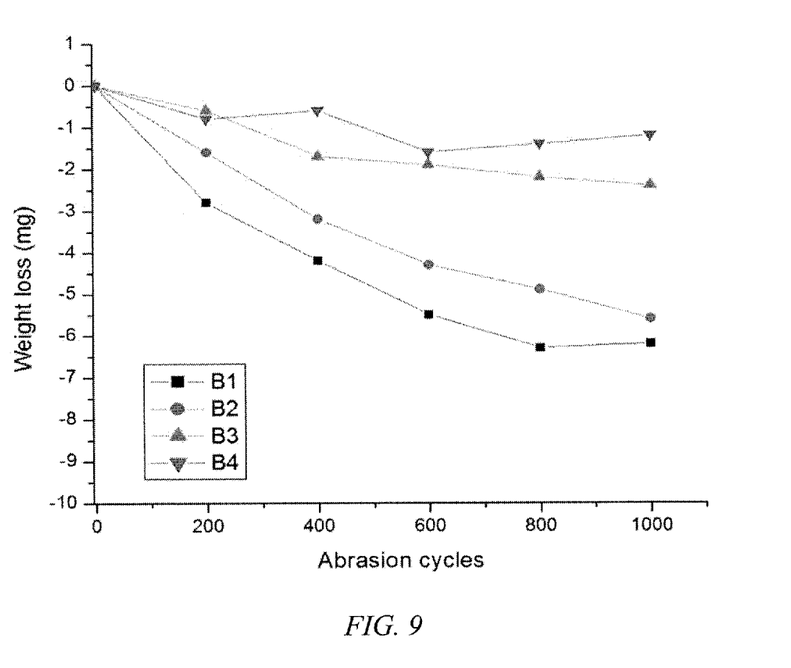
FIG. 9 shows composite plots of weight loss in mg after abrasion of surfaces coated with B1-B4 paints, according to an embodiment of the invention, after a series of 0 to 1000 cycles of wiping with an abrasive.

Blue paint B1 lost superhydrophobicity after 200 wiping cycles and B4 after 400 cycles. In contrast, B2 and B3 displayed durability and remained superhydrophobic through 1000 wiping cycles, as indicated in FIG. 8. From the weight loss plotted in FIG. 9, wear indexes were calculated to be −6.2 E-3, −5.6 E-3, −2.4 E-3, and −1.2 E-3 mg/per cycle for B4, respectively. Total weight losses after 1000 cycles for B1-B4 were 0.26, 0.24, 0.09, and 0.04 percent for B1-B4, respectively.

Figure 10:
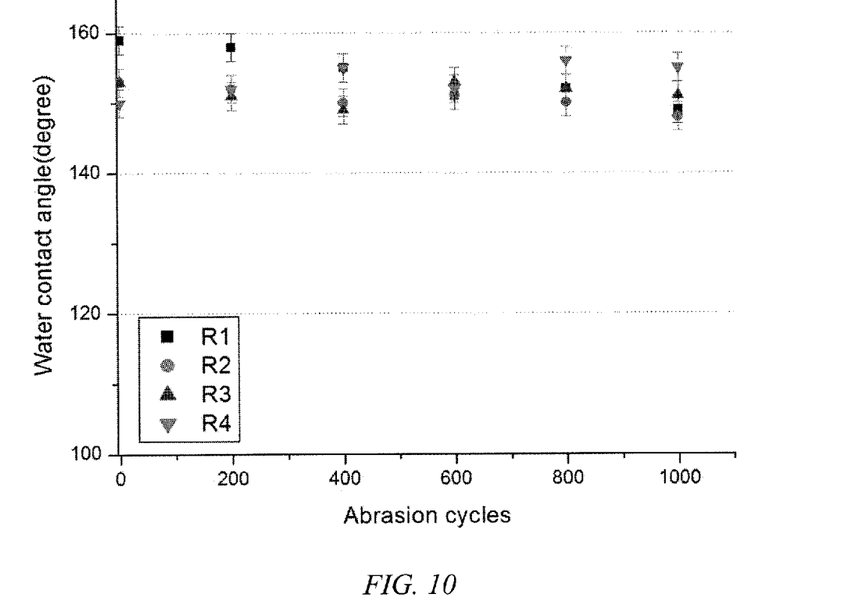
FIG. 10 shows composite plots of WCAs on surfaces coated with R1-R4 paints, according to an embodiment of the invention, from 20 µL water droplets at 20° C. after a series of 0 to 1000 cycles of wiping with an abrasive.
Figure 11:
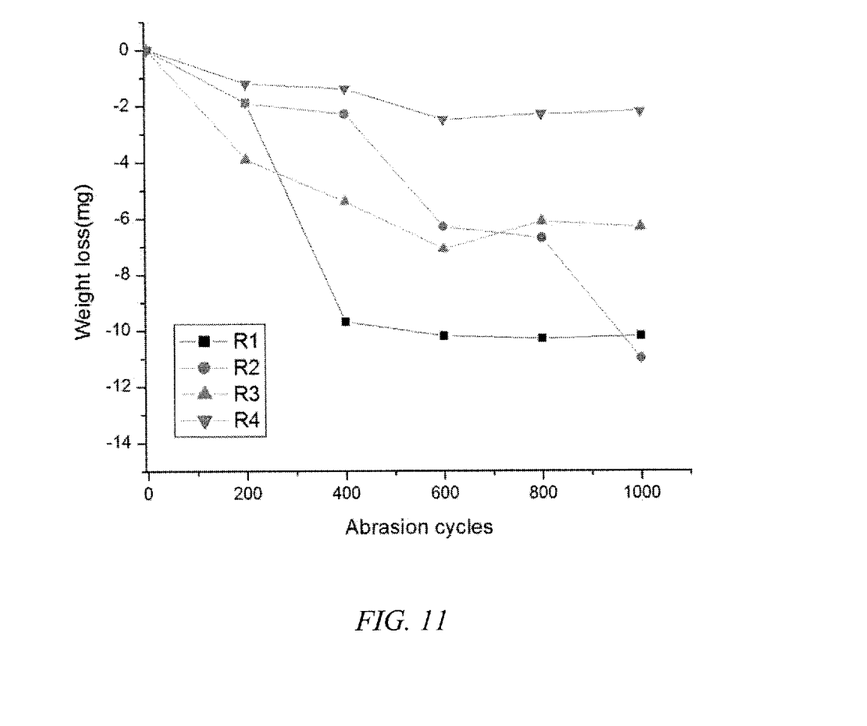
FIG. 11 shows composite plots of weight loss in mg after abrasion of surfaces coated with R1-R4 paints, according to an embodiment of the invention, after a series of 0 to 1000 cycles of wiping with an abrasive.
Figure 12:
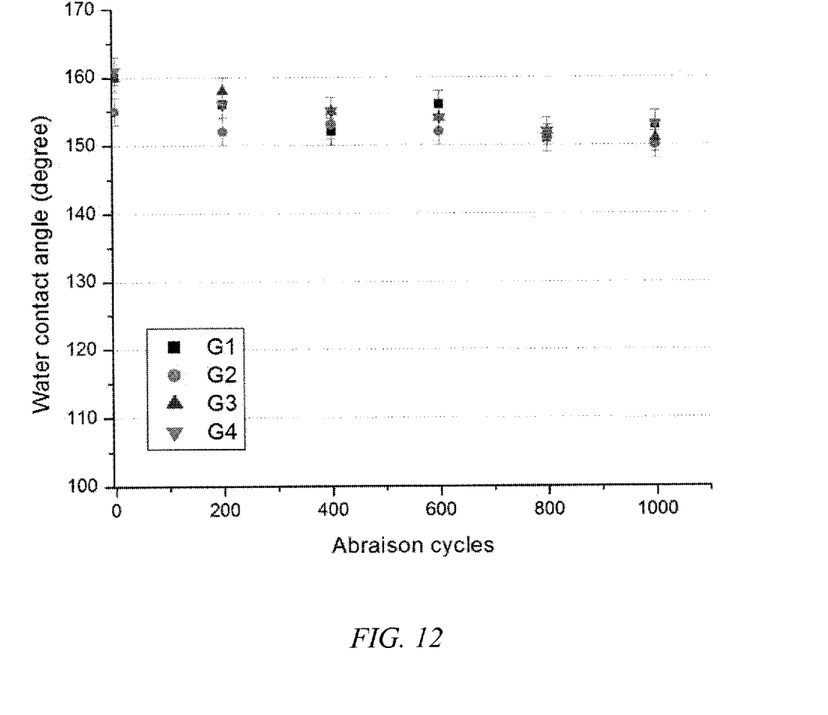
FIG. 12 shows composite plots of WCAs on surfaces coated with G1-G4 paints, according to an embodiment of the invention, from 20 µL water droplets at 20° C. after a series of 0 to 1000 cycles of wiping with an abrasive.
Figure 13:
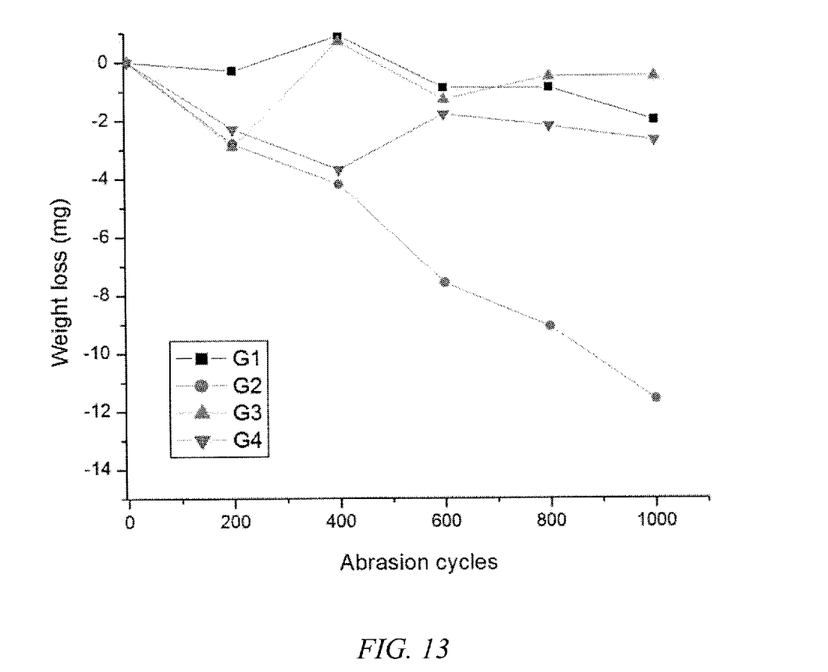
FIG. 13 shows composite plots of weight loss in mg after abrasion of surfaces coated with G1-G4 paints, according to an embodiment of the invention, after a series of 0 to 1000 cycles of wiping with an abrasive.

Red paints R1-R4 displayed excellent durability with retention of superhydrophobicity after 1000 wiping cycles, as plotted in FIG. 10. The calculated wear index from the data plotted in FIG. 11 was −10.2 E-3, −11 E-3, −6.3 E-3, and −2.2 E-3 mg/per cycle for R1-R4, respectively. Total weight losses after 1000 cycles for R1-R4 were 0.47, 0.41, 0.25, and 0.09 percent for R1-R4, respectively.

Green paints, G1-G4 displayed excellent durability with retention of superhydrophobicity after 1000 wiping cycles, as plotted in FIG. 10. The calculated wear index from the data plotted in FIG. 11 was −2 E-3, −11.6 E-3, −0.5 E-3, and −2.7 E-3 mg/per cycle for G1-G4, respectively. Total weight losses after 1000 cycles for G1-G4 were 0.08, 0.45, 0.02, and 0.11 percent for G1-G4, respectively.

It should be understood that the examples and embodiments described herein are for illustrative purposes only and that various modifications or changes in light thereof will be suggested to persons skilled in the art and are to be included within the spirit and purview of this application.

We claim:

1. A colored superhydrophobic paint, comprising hydrophobic particles, a polymer binder, and at least one plasticizer, suspended in a solvent, wherein at least one of the hydrophobic particles is a colored hydrophobic particle, and whereby the paint is dispersible on a substrate by spraying, rolling, brushing, or spin coating, wherein the plasticizer is a mixture of triethyl phosphate and perfluoro(butyltetrahydrofuran).

2. The colored superhydrophobic paint according to claim 1, wherein the hydrophobic particles are metal oxide particles.

3. The colored superhydrophobic paint according to claim 1, wherein the hydrophobic particles comprise white metal oxide particles selected from $SiO_2$, $TiO_2$, and $Al_2O_3$, and wherein the hydrophobic particles are coated with a fluorinated alkyl silane or an alkyl silane.

4. The colored superhydrophobic paint according to claim 1, wherein the colored particles comprise one or more colored metal oxide particles.

5. The colored superhydrophobic paint according to claim 4, wherein the colored metal oxide particles are ultramarine, iron oxide and/or chromium oxide.

6. The colored superhydrophobic paint according to claim 1, wherein the hydrophobic particles are 40 nm to 100 micrometers in diameter.

7. The colored superhydrophobic paint according to claim 1, wherein the polymer binder is a mixture of PDVF and PMMA.

8. The colored superhydrophobic paint according to claim 4, wherein the weight ratio of PDVF to PMMA is 3:1 to 10:1.

9. The colored superhydrophobic paint according to claim 1, wherein the solvent is DMF (dimethylformamide), MEK (methyl ethyl ketone), or isophorone.

10. A colored superhydrophobic object, comprising a coating formed by deposition of the colored superhydrophobic paint according to claim 1 on an object having a surface comprising glass, plastic, wood, or metal.

* * * * *